March 25, 1969 L. C. HOUSTON Re. 26,557

CONTAINER

Original Filed Sept. 3, 1964 Sheet 1 of 2

INVENTOR.
LEWIS C. HOUSTON
BY
Baldwin & Martin
ATTORNEYS

March 25, 1969 L. C. HOUSTON Re. 26,557

CONTAINER

Original Filed Sept. 3, 1964 Sheet 2 of 2

INVENTOR.
LEWIS C. HOUSTON
BY
Baldwin & Martin
ATTORNEYS

United States Patent Office

Re. 26,557
Reissued Mar. 25, 1969

26,557
CONTAINER

Lewis C. Houston, Port St. Joe, Fla., assignor to St. Joe Paper Company, Jacksonville, Fla., a corporation of Florida Original No. 3,258,188, dated June 28, 1966, Ser. No. 394,193, Sept. 3, 1964. Application for reissue Mar. 26, 1968, Ser. No. 719,797
Int. Cl. B65d *3/24, 5/48, 45/00*
U.S. Cl. 229—15 16 Claims

Matter enclosed in heavy brackets [ ] appears in the original patent but forms no part of this reissue specification; matter printed in italics indicates the additions made by reissue.

This invention relates to containers and more particularly to fibreboard containers of the type adapted for use in connection with the handling, storing and transporting fruits and vegetables and the like.

The transportation and storage of produce is commonly accomplished by packaging such produce in corrugated kraft board containers. Typically, such kraft board or fibreboard is manufactured from a pair of spaced, parallel, flat liner sheets between which is adhesively secured a corrugating medium which imparts overall strength thereto. Such corrugated fibreboard is commonly referred to in the art as single wall corrugated board. The present invention is particularly adapted to containers assembled from blanks of single wall corrugated board. It is to be understood that other suitable materials, for example, double wall corrugated board, may be used in the construction of the container in accordance with the invention.

In containers of fibreboard, it is common practice to cut and score flat pieces of fibreboard to provide container blanks having score or fold lines and incised or cut out portions. Such blanks are usually shipped flat to the packing plant, where it is then erected for use by folding along the score lines to form a suitable container for the produce, and after filling thereof, the container is closed ready for shipment and/or storage.

A general object of this invention is to provide an improved container.

Another general object is the provision of an improved compartmented container.

An additional general object is to provide an improved self-locking cover and body of a container.

A particular object is to provide an improved rectangular body of a container of unusual sturdiness, characterized by reinforced corners adjacent the upper edge thereof.

A related particular object is the provision of an improved container body in which the upper edge is reinforced substantially around the perimeter thereof.

An additional particular object is the provision of an improved rectangular container body, characterized by double thickness slides, single thickness ends, double thickness upper edge portions of the ends, and triple thickness upper edge portions of the sides.

A further particular object is to provide an improved integral blank for folding into a rectangular container body which is prescored and precut with a minimum of waste material.

A specific object is the provision of an improved compartmented container wherein the divider is provided with self-locking means cooperative with the container body for locking and maintaining such body in erected and usable condition, without use of staples and the like.

An additional specific object is to provide an improved rectangular container cover and body wherein the cover and body are provided with interlocking means for locking and retaining the cover on the body at the upper ends and sides thereof.

Another specific object is to provide an improved container which may be shipped and/or stored in knock down or flat condition and which may be quickly assembled and erected for use without skilled labor and without use of connectors, such as nails, staples, tapes, adhesives and the like.

A further specific object is the provision of an improved container which is simple in design, rugged in construction and economical to manufacture with a minimum of waste.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
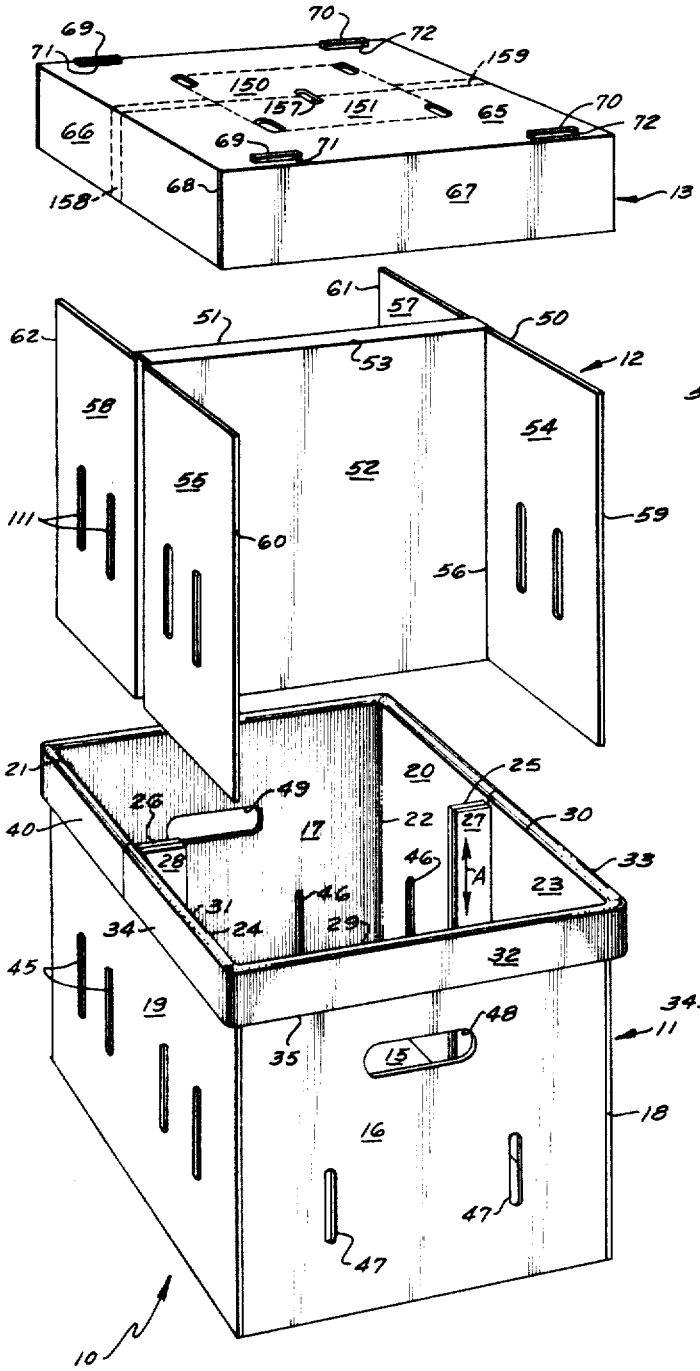
FIGURE 1 is a perspective view of the container embodying the invention, the cover, divider and body portions of the container being shown in exploded open positions.

Referring now more particularly to FIGURE 1, the container is generally depicted at 10 and comprises a rectangular body 11, a liner or divider 12 and a cover 13. Body 11 includes a single thickness bottom 15 joined to upstanding single thickness end walls 16 and 17 and to upstanding outer side walls 18 and 19. A pair of inner side wall panels 20 and 21 are connected by wall angle fold lines, such as line 22, to end wall 17, it being understood that inner side wall panels 23 and 24 are similarly connected to end wall 16. Opposite respective wall angle fold lines, including line 22, the inner side panels 20, 21, 23 and 24 are provided with inwardly directed flanges 25, 26, 27 and 28, flanges 25 and 26 abutting oppositely disposed flanges 27 and 28 generally medial between end walls 16 and 17.

Figure 3:
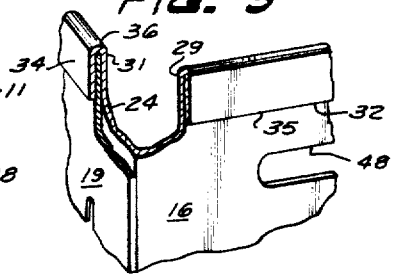
FIGURE 3 is a partial perspective view of the upper left corner of the body portion of the container.

The upper ends 29, 30 and 31 respectively of end wall 16 and inner side wall panels 23 and 24 include an outwardly and downwardly directed semi-perimeter flange 32 which is constituted by side wall portions 33 and 34 and end wall portion 35. The upper edge portions, including edge portion 36, as seen in FIGURE 3, of outer side walls 18 and 19 are nestingly disposed between the downwardly directed flange side wall portions 33 and 34 and respective inner side wall panels 23 and 24. A similar semi-perimeter flange 40 is provided at the upper edges of end wall 17 and inner side wall panels 20 and 21 thereby providing, with flange 32, an outwardly and downwardly directed perimeter locking means for cooperatively retaining the cover 13 thereon, as described more fully hereinafter. The outwardly and downwardly directed semi-perimeter flanges 32 and 40 reinforce the upper perimeter edge of the container body 11 and greatly strengthen the upper corners thereof.

A plurality of vents 45 are provided in the outer side walls 18 and 19 and corresponding vents 46 extend through inner side wall panels 20, 21, 23 and 24 which align with respective vents 45. Additional vents 47 are cut out of end walls 16 and 17, as desired to prevent spoilage of perishable produce which may be packaged therein. Elongated handle holes 48 and 49 are provided in the respective body end walls 16 and 17 spaced below the respective outwardly and downwardly extending semi-perimeter flanges 32 and 40.

Figure 2:
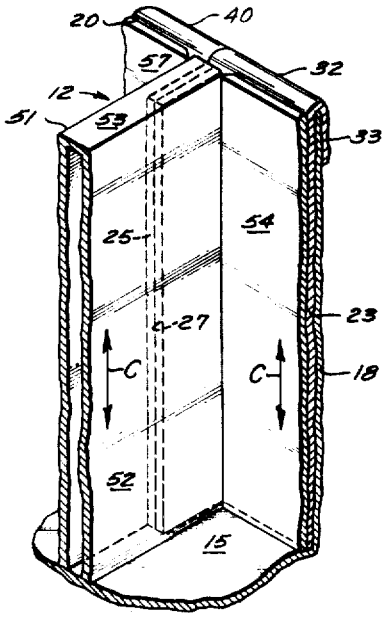
FIGURE 2 is an enlarged partial perspective view of the assembled divider and body portions of the container.

Means are provided in the container 10 for locking and maintaining body 11 in its erected and usable condition, such means being depicted at 50, and herein is constituted by liner 12. Liner 12 includes a pair of spaced partition walls 51 and 52 connected at their upper ends by intermediate portion 53, which overlies the upper edges of flanges 25, 26, 27 and 28 when liner 12 is inserted into the open ended container body 11 as shown in FIGURE 2. A pair of side wall liner portions 54 and 55 are connected by vertical score lines, such as line 56, to partition wall 52 and extend toward body end wall 16 sufficiently to be nestingly disposed within respective body wall angles adjacent end wall 16 when liner 12 is positioned in operative relation internally of container body 11. Similarly, side wall liner portions 57 and 58 are connected by vertical score lines to partition wall 51 and extend toward and are adapted to be nestingly disposed within body wall angles adjacent end wall 17. When liner 12 is in its operative position within container body 11, the inwardly directed pairs of flanges 25 and 27, and flanges 26 and 28 are lockingly retained in juxtaposition between the inwardly directed opposite faces of partition walls 51, 52 with the vertical ends 59, 60, 61 and 62 nestingly fitted into respective wall angles of the container body 11 thereby firmly locking body 11 in an upright, erected and usable condition. When the liner 12 is so positioned the outwardly directed faces of liner portions 54, 55, 57 and 58 are adjacent and parallel to respective inwardly directed faces of the inner side wall panels 23, 24, 20 and 21, thereby providing the container 10 with triple thickness side walls.

The cover 13 of container 10 comprises a top panel 65 having depending side walls, such as wall 66, arranged to telescope over the upper open end portion of the container body 11. Cover side wall 66 has an end ear 68 tucked into and held by double folded end wall 67, which includes spaced locking tabs 69 and 70 inserted into spaced openings 71 and 72 in top panel 65, and a similar corner construction is employed at each corner of cover 13. Cover 13 includes means inwardly thereof for interengagement with the semi-perimeter flanges 32 and 40 of the container body 11 at the ends and sides thereof when the cover 13 is closingly placed over the body 11 thereby providing a positive lock therebetween at the sides and ends of container 10, such an arrangement being more fully described in connection with FIGURE 4.

Figure 5:
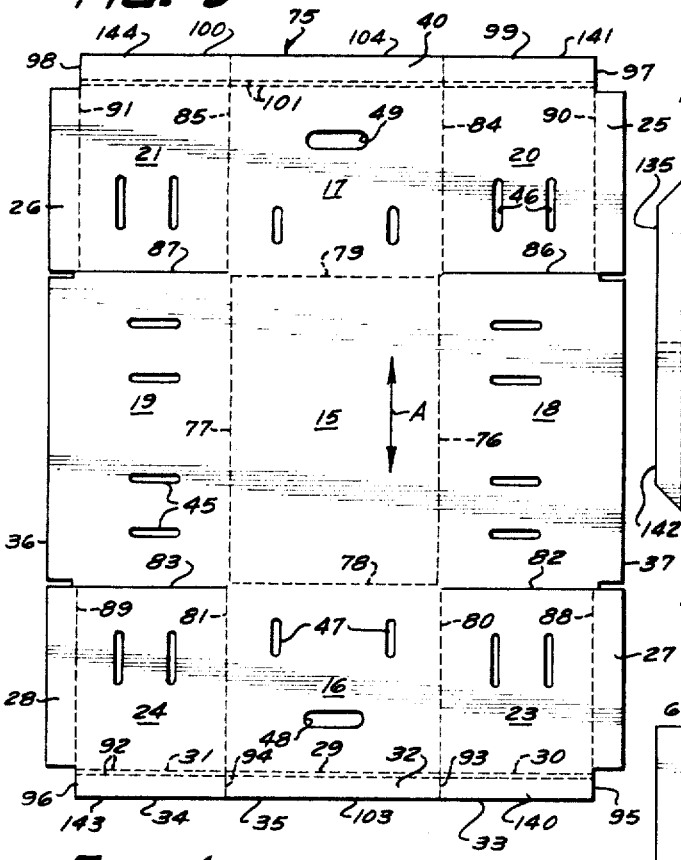
FIGURE 5 is a plan view of a blank embodying the invention for forming the body portion of the container.

The parts of the blank 75, as shown in FIGURE 5, for the body 11 of container 10 are identified with identical reference characters as employed in connection with the respective corresponding parts of the assembled or erected container body 11 as shown in FIGURES 1, 2 and 3. Blank 75 is shown in its completed form after it has been cut from a sheet of single wall corrugated board in the desired peripheral outline with a minium of waste thereof. The blank 75 has been prescored, as indicated by broken lines, and precut as indicated by full lines, to permit proper manipulation thereof into the container body 11.

Blank 75 comprises a rectangular bottom 15, outer side walls 18 and 19 extending respectively from opposite elongated edges or fold lines 76 and 77 of bottom 15, and end walls 16 and 17 extending respectively from opposite reduced edges or fold lines 78 and 79. Inner side wall panels 23 and 24 are formed along the respective opposite edges or score lines 80 and 81 of end wall 16, panels 23 and 24 having free edges 82 and 83 cut from respective outer side walls 18 and 19. Inner side wall panels 20 and 21 are similarly joined to respective edges or score lines 84 and 85 of end wall 17 and have free edges 86 and 87 cut from respective outer side walls 18 and 19. Flanges 27, 28, 25 and 26 are joined by respective flange angle fold lines 88, 89, 90 and 91, which extend substantially parallel to score lines 80, 81, 84 and 85, to respective side wall panels 23, 24, 20 and 21.

The semi-perimeter flange 32 is formed along the upper ends 29, 30 and 31 of end wall 16 and inner side wall panels 23 and 24 as shown by double perforated score lines 92, and lateral score lines 93 and 94 intersect double score lines 92 and are extensions of respective score lines 80 and 81 thereby dividing flange 32 into side wall portions 33 and 34 and end wall portion 35. Flange portions 33 and 34 terminate in free edges 95 and 96 opposite respective lateral score lines 93 and 94, free edges 95 and 96 being in general alignment with respective fold lines 80 and 81 so that edges 95 and 96 will be closely adjacent respective free edges 97 and 98 of flange portions 99 and 100 of semi-perimeter flange 40 thereby providing a substantially complete perimeter flange around the upper portion of the container body 11. Flange 40 is similarly joined by double perforated score lines 101 along the upper ends of end wall 17 and inner side wall panels 20 and 21.

The double perforated score lines 92 and 101 are the preferred manner of construction for the container body 11 to permit the proper folding of the flanges 32 and 40 outwardly and downwardly to lie externally of the outer side walls 18 and 19 of the end walls 16 and 17. It is to be understood that other techniques of accomplishing substantially similar results may be employed in lieu thereof, for example, a five point double wall score may be used which provides two scores on one face of the corrugated sheet material and three scores on the other face thereof. The lateral scores 93 and 94 on semi-perimeter flange 35, and similar scores on flange 40, are provided to permit such flanges to properly bend around the corners formed at the upper end portions of adjacent side and end walls of the container body 11.

The blank 75, shown in FIGURE 5, is transformed into the fully set-up or erected container body 11, shown in FIGURE 1, by the exemplified manipulative steps hereinbelow. First, the semi-perimeter flanges 32 and 40 are respectively folded substantially 180° downwardly along double perforated score lines 92 and 101 to lie outwardly of and adjacent end walls 16 and 17. Flanges 25, 26, 27 and 28 are folded substantially 90° upwardly along respective fold lines 90, 91, 88 and 89 to assume a vertical position. Inner side wall panels 20, 21, 23 and 24 are bent substantially 90° upwardly along respective score lines 84, 85, 80 and 81. The outer side walls 18 and 19 are folded substantially 90° upwardly along their respective fold lines 76 and 77 into their erected vertical position. Each of the end walls 16 and 17 is then bent upwardly, with each of its attached inner side wall panels 23, 24 and 20, 21 being positioned slightly inwardly of the vertical outer side walls 18 and 19, along its respective fold lines 78 and 79. As the end walls 16 and 17 are being manipulated upwardly, the upper edge portions 36 and 37 of respective outer side walls 19 and 18 are slidably positioned between the respective downturned semi-perimeter flange portions 34 and 33 and inner side wall panels 24 and 23, and are also slidably positioned between the respective downturned semi-perimeter flange portions 100 and 99 and inner side wall panels 21 and 20. With the end walls 16 and 17 fully erected into their vertical position; the semi-perimeter flanges 32 and 40 frictionally engage and retain outer side walls 18 and 19 in their erected vertical positions, and the inwardly directed locking flanges 25 and 27 abut and flanges 26 and 28 abut thereby completing the container body 11 as shown in FIGURE 1.

Figure 7:
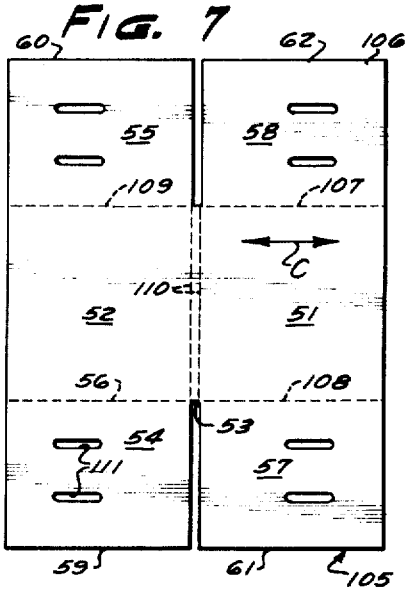
FIGURE 7 is a plan view of a blank for forming the divider portion of the container in accord with the invention.

The liner blank 105, shown in FIGURE 7, is properly scored on its upper face 106 along lines 107, 108, 109 and 56 which are the respective lines on which partition side wall liner portions 58, 57, 55 and 54 are folded. A double fold line 110 is scored on the reverse face (not shown) of blank 105, such double fold line 110 defining the intermediate portion 53 between partition walls 51 and 52. After the blank 105 is folded upwardly along score lines 107, 108, 109 and 56 and folded downwardly along double fold line 110, the liner or divider 12 is completely set up, as shown in FIGURE 1, for positioning within the erected container body 11 with the abutting flanges 25, 27 and flanges 26 and 28 lockingly retained between partition walls 51 and 52 and the edges 59, 60, 61 and 62 being nestingly disposed within respective body wall angles, including wall angle 22. The liner blank 105 is provided with a plurality of vents 111 in the side wall liner portions 54, 55, 57 and 58 which generally align with respective corresponding vents 46 in the inner side wall panels 20, 21, 23 and 24 which in turn are aligned with vents 45 in outer side walls 18 and 19.

Figure 6:
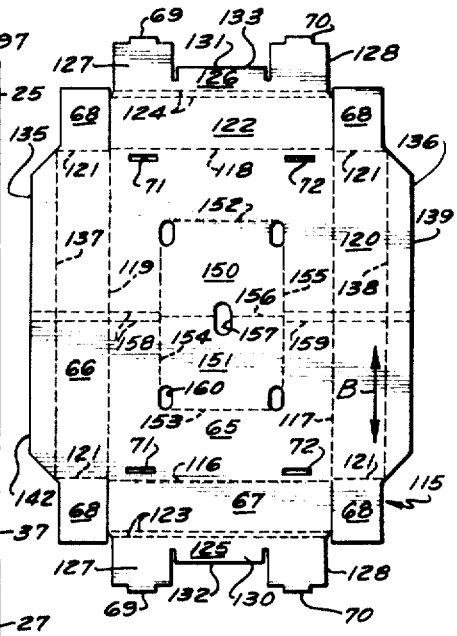
FIGURE 6 is a plan view of a blank embodying the invention for forming the cover embodying the invention.

The cover blank 115 is shown in its finished form in FIGURE 6, having been cut from a piece of single wall corrugated board to provide the desired peripheral outline. Blank 115 comprises a center top panel 65 of rectangular plan and defined by fold lines 116, 117, 118 and 119. Side panels or walls 66 and 120 extend longitudinally of fold lines 119 and 117 and terminate at each end in an end locking flap or ear 68. Each locking ear 68 is hingedly attached to a respective end of the cover side walls 66 and 120 by a fold line 121 which extends parallel to the end wall fold lines 116 and 118 by which respective end walls 67 and 122 are attached to top panel 65. Each fold line 121 is spaced inwardly of the next adjacent fold line 116 and 118 a distance substantially equal to the thickness of the corrugated board in the conventional manner. End walls 67 and 122 have outer longitudinal edges defined by double score lines 123 and 124 which are parallel to fold lines 116 and 118. Inner end wall portions 125 and 126 are hingedly connected along respective double score lines 123 and 124. Inner end wall portions 125 and 126 each have a pair of spaced locking flaps 127 and 128 terminating outwardly in friction locking tabs 69 and 70. Correspondingly, the top panel 65 is provided with spaced openings or slots 71 and 72 aligned with respective tabs 69 and 70. Each of the slots 71 and 72 is of a length substantially equal to the length of the associated tabs 69 and 70 and of a width substantially equal to the thickness of such tabs.

The means for locking the cover 13 to the body 11 is seen to include end wall parts or flanges 130 and 131 of respective inner end wall portions 125 and 126, such flanges 130 and 131 being located between respective pairs of locking flaps 127 and 128 and terminating spacedly inwardly of locking tabs 69 and 70. The free upper edges 132 and 133 of the upwardly extending end wall flanges 130 and 131 are adapted to engage with respective lower free edges 103 and 104 of semi-perimeter flanges 32 and 40 of container body 11 as described more fully in connection with FIGURE 4.

Figure 4:
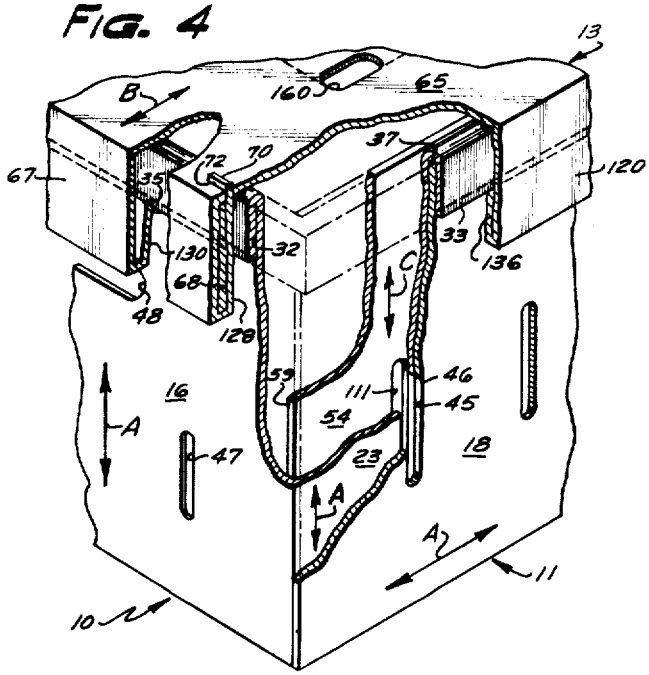
FIGURE 4 is a partial perspective view of the erected container with the cover portion in closing relation with respect to the body portion thereof.

The cover side walls 66 and 120 include respective elongated side flanges 135 and 136 hingedly connected thereto by fold lines 137 and 138 which extend parallel to fold lines 117 and 119. The free upper edge 139 of cover side flange 136 is adapted for engagement with the respective lower free inner side panel edges 140 and 141 of semi-perimeter flanges 32 and 40 as shown in FIGURE 4 and described hereinbelow. The free upper edge 142 of cover side flange 135 similarly engages each of the lower free inner side panel edges 143 and 144 of semi-perimeter flanges 32 and 40.

Generally medial of top panel 65, openable flaps 150 and 151 are provided to permit inspection of the contents of the filled container. Flaps 150 and 151 are hingedly attached to the remainder of the top panel 65 by score lines 152 and 153 which extend parallel to score lines 116 and 118. A pair of parallel perforated score lines 154 and 155 extend between score lines 152 and 153, lines 154 and 155 being parallel to score lines 117 and 119. A lateral perforated score line 156 extends between perforated score lines 154 and 155 and is parallel to score lines 152 and 153. A finger opening 157 extends through top panel 65 generally laterally of perforated score line 156 and on either side thereof providing each flap 150 and 151 with means by which each such flap may be forcibly torn along the perforated score lines 156, 154 and 155, as desired, and remain hinged on either score line 152 and 153 for reclosing. Vents 160 extend through flaps 150 and 151 adjacent the intersection between score lines 152 and 153 and perforated score lines 154 and 155. If desired lines 152 and 153 may also be perforated in order that the entire flaps 150 and 151 may be removed and the vents 160 would also then be used in the same manner as set forth above with respect to finger opening 157. Tear strips 158 and 159 are provided on the cover blank 115 and extend lateraly across the top panel 65 on either side of flaps 150 and 151, generally in alignment with score line 156. After the cover 13 is placed on the erected container body 11 and the inwardly and upwardly directed locking end flanges 130 and 131 and side flanges 135 and 136 engage and lock beneath outwardly and downwardly directed semi-perimeter flanges 32 and 40, it is difficult to remove the cover 13 from the container body 11 without the incorporation of, for example, tear strips 158 and 159 in the cover 13.

The cover blank 115 is assembled into the cover 13 by first bending the side flanges 135 and 136 downwardly along fold lines 137 and 138. The side walls 66 and 120 are folded downwardly and inwardly along fold lines 119 and 117 until the side walls 66 and 120 are perpendicular to the top panel 65. The end ears 68 are bent inwardly along fold lines 121 until the ears 68 are perpendicular to the upstanding side walls 66 and 120. Thereafter, the end walls 67 and 122 are folded downwardly along fold lines 116 and 118 until the end walls 67 and 122 are perpendicular to top panel 65 and the end walls 67 and 122 are in face to face abutment with locking end ears 68. Next the end wall portions 125 and 126 are folded inwardly and upwardly over end ears 68 and the tabs 69 and 70 are inserted into their cooperating openings 71 and 72 in top panel 65 thereby completing the erection of the cover 13 from blank 115.

Referring to FIGURES 1–4, and particularly to FIGURE 4, the cover 13 is shown in a closed and locked position on the container body 11. The elongated cover locking flanges, including end flange 130 and side flange 136 project inwardly and upwardly toward the container body 11, and are lockingly engaged beneath the elongated body lockng flanges, including end flange 35 and side flange 33. The outturned flange 32, which extends substantially around one half of the perimeter of the container and around the outer side walls 18 and 19 and end wall 16, is under tension thereby maintaining the flange 32 closely adjacent and/or contiguous with the outer side walls 18 and 19 and end wall 16. Such tensioning of the flange 32 permits the proper engagement between the cover locking upturned flanges and the body locking downturned flanges in order that the cover flanges will not move and become positioned between the body locking flanges and the upstanding outer side walls of the body 11. The outturned flanges 32 and 40 provide the container body 11 with a reinforced upper edge and reinforced upper corners because the flanges are substantially continuous around such corners. Furthermore, the outturned flanges 32 and 40, being under tension and extending over the outer side walls 18 and 19, provide friction locking means for such outer side walls, particularly adjacent the corners of the container body 11. FIGURE 4 clearly depicts the vertical end 59 of side wall liner portion 54 nested in the wall angle formed between end wall 16 and inner side wall panel 23.

After the cover 13 is locked onto the container body 11, as shown in FIGURE 4, the removal of the cover from the body is difficult and the tear strips 158 and/or 159 may be forcibly pulled to facilitate the removal of the cover 13 from the body 11. The loaded container may then have its entire contents exposed for display and/or removed therefrom. If the contents of the filled container 10 is to be inspected, the inspector or buyer merely forcibly opens one or both of the inspection flaps 150 and 151.

The corrugations in the body blank 75 is indicated by arrow A, and arrows B and C respectively depict the corrugations in cover blank 115 and liner blank 105. In the erected or set up condition of the container as shown in FIGURES 1, 2, 3, and 4, the corrugations A in the outer side walls 18 and 19 are horizontal thereby providing the container with end to end compression strength. The corrugations A in the end walls 16 and 17 and the inner side wall panels 21, 22, 23 and 24 are vertical to allow the container 10 to have a high stacking strength. The stacking strength is increased by the vertical corrugations C in side wall liner portions 54, 55, 57 and 58 and in partition walls 51 and 52. Also, the vertical corrugations A of the inwardly directed locking flanges 25, 26, 27 and 28 increases the container stacking strength. While single wall corrugated board is specifically shown and described herein, it will be apparent that other types of board suitable for containers may be substituted if desired.

It will be apparent that corrugations as depicted by arrow B may extend in the direction of end walls 67 and 122 thereby providing the container with side to side compression strength.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A compartmented rectangular container comprising a body portion and a divider portion, said body portion including a bottom and upstanding end walls and upstanding outer side walls, upstanding inner side wall panels connected by vertical wall angle fold lines to each said end wall, said inner side wall panels extending from said wall angles toward the opposite end wall and terminating in an inwardly directed vertical locking flange [generally medial of and] perpendicular to said outer side walls, said locking flanges adjacent respective outer side walls being in face to face closely adjacent relation, means connected to said inner side wall panels for maintaining said outer side walls in upstanding positions, said divider portion including a pair of upstanding partition walls and an intermediate portion interconnecting said partition walls in spaced face to face relation, said locking flanges being positioned between said partition walls, said divider further including means attached to said partition walls for maintaining said partition walls in closely spaced relation thereby retaining said locking flanges therebetween and maintaining said inner side wall panels in upstanding positions.

2. A rectagular container having a body portion and a cover portion, said cover portion *including means for locking said cover portion to said body portion having a pair of oppositely disposed portions terminating upwardly in respective* [having upwardly extending] locking edges *within said cover portion,* said body portion comprising a rectangular bottom having side edges and end edges, two upstanding [outer] side walls attached to respective said bottom side edges, two upstanding end walls attached to respective said bottom end edges, *a* [an inner] side wall panel connected to each end wall by a vertical fold line and forming a wall angle, [said inner side wall panels being inwardly disposed contiguous with said outer side walls,] a first flange connected along the upper edges of one said end wall and its attached said [inner] side wall panels by a score line, said first flange extending outwardly and downward *from* [over] the upper ends of said side walls adjacent said one end wall *and terminating downwardly along the side wall outer surface,* a second flange connected along the upper edges of the other said end wall and its attached said [inner] side wall panels by a score line, said second flange extending outwardly and downwardly *from* [over] said upper side wall ends adjacent said other end wall *and terminating downwardly along the side wall outer surface,* said first and second flanges extending outwardly of and around the wall angles formed between said end walls and said [inner] side wall panels, said flanges being under tension to maintain said flanges closely adjacent said side wall and end walls, said flanges terminating in lower edges adapted to be engaged [adjacent said end walls and said outer side walls of said body portion] by *said oppositely disposed* upwardly extending locking edges of *said* [a] cover.

3. A [compartmented] container comprising a body portion and a *liner* [divider] portion, said body portion having a rectangular bottom, upstanding end walls and upstanding outer side walls, a first pair of upstanding inner side wall panels having inner edges connected along wall angle fold lines respectively to the side edges of one said end wall, a second pair of upstanding inner side wall panels having inner edges connected along wall angle fold lines respectively to the side edges of the other said end wall, an elongated upstanding flange having an inner side edge connected by a flange angle fold line along the outer side edge of each said side wall panel, each said flange having a free outer side edge opposite its said inner side edge which terminates inwardly of the container, said flanges connected to said first pair of side wall panels being closely adjacent respective said flanges connected to said second pair of side wall panels, means attached to said inner side wall panels for maintaining said outer side walls in their upstanding positions, [said divider portion including a pair of upstanding partition walls spaced in face to face relation generally parallel to said end walls and defining therebetween a space for the reception thereinto of said adjacent flanges,] said *liner* [divider] portion *including* [having] side wall portions *having outer nad inner edges and* [connected along their inner edges by fold lines to respective side edges of said partition walls, each said side wall portion] being *respectively* positioned contiguous with a respective said inner side wall panel with *said* [its] outer edge of said side wall portion nested within a respective wall angle and its said inner edge nested within a respective flange angle thereby to lock said adjacent flanges between said side wall portions of said *liner* [divider].

4. A two-piece compartmented container comprising a body portion and a divider portion, said body portion including a rectangular bottom and upstanding end walls and upstanding outer side walls, a first pair of upstanding inner side wall panels having vertical inner edges connected along wall angle fold lines to respective vertical side edges of one said end wall, a second pair of upstanding inner side wall panels having vertical inner edges connected to respective vertical side edges of the other said end wall, an upstanding flange having a vertical inner side edge connected by a flange angle fold line along the vertical outer side edge of each said inner side wall panel, one said inner side wall panel from each said first and second pair of upstanding inner side wall panels being substantially in the same plane and being contiguous with one said outer side wall, the other said inner side wall panel from each said first and second pair of upstanding inner side wall panels being substantially in the same plane and being contiguous with the other said outer side wall, each said flange extending generally perpendicularly from said inner side wall panel and inwardly of said body portion and terminating in an upstanding outer side edge therewithin, said flanges adjacent said one outer side wall being positioned in closely spaced face to face relation, said flanges adjacent said other outer side wall being positioned in closely spaced face to face relation, means attached to said inner side wall panels for maintaining said outer side walls in their upstanding positions, said divider portion including a pair of upstanding partition walls spaced in face to face relation in a general plane perpendicular to said outer side walls and defining therebetween a space for the reception thereinto of said flanges, said divider portion having sid wall portions connected along their inner edges by fold lines to respective side edges of said partition walls, each said side wall portion being positioned contiguous with a respective said inner side wall panel with its outer edge nested within a respective wall angle formed between respective said inner side wall panel and respective said end wall, and with its inner edge nested within a respective flange angle formed between respective said flange and respective said inner side wall panel thereby forcing said closely spaced flanges adjacent each said outer side wall into face to face contact and locking said flanges between said side wall portions of said divider.

5. The container as defined in claim 4 wherein said means for maintaining said outer side walls includes a first elongated flange connected along the upper edges of said first pair of inner side wall panels and said one end wall by double score lines, a second elongated flange connected along the upper edges of said second pair of inner side wall panels and said other end wall by double score lines, said elongated flanges being folded substantially 180° outwardly over the upper edge portions of said outer side walls, said elongated flanges being closely adjacent the respective outer surfaces of said end walls and the outer surfaces of said outer side walls, said outer side wall upper portions being nested between said elongated flanges and said inner side wall panels thereby maintaining said outer side wall panels in their upstanding positions.

6. A covered rectangular container comprising a body portion and a cover portion, said body portion including two upstanding spaced end walls and two upstanding spaced side walls forming four wall angles, said body portion having a first elongated flange extending outwardly and dowwardly *from* [over] the upper ends of one said side wall and one said end wall and terminating in a lower edge spaced downwardly from said upper ends, said body portion having a second elongated flange extending outwardly and downwardly *from* [over] the upper ends of the other said side wall and the other said end wall and terminating in a lower edge spaced downwardly from said upper ends, said flanges respectively being continuous around the wall angle between said one end and side wall and said other end and side wall, said flanges being under tension to maintain said flanges closely adjacent said end walls and side walls, said cover including a top panel and depending end and side walls, means attached to said cover end and side walls for lockingly engaging said elongated flanges of said body portion adjacent each said end walls and side walls of said body portion, said means for lockingly engaging said elongated flanges including a pair of side flanges attached to the respective lower edges of said depending side walls by fold lines, a pair of end flanges attached to the respective lower edges of said depending end walls by fold lines, said side and end flanges being folded inwardly of said cover and upwardly from said lower edges of said depending walls and terminating in upper edges, said upper edges of said cover flanges upwardly abutting said lower edges of said body flanges adjacent respective said end walls and side walls of said body portion thereby locking said cover on said body portion.

7. An integral blank for folding into a container body comprising a rectangular bottom having *a first pair of* [elongated] edges oppositely disposed and *a second pair of* [reduced] edges oppositely disposed which extend laterally of said *first pair of* [elongated] edges, a pair of rectangular outer side walls having their lower edges respectively connected by fold lines to said *first pair of* [elongated] edges, a pair of rectangular end walls having their lower edges respectively connected by fold lines to said *second pair of* [reduced] edges, a pair of rectangular inner side wall panels having side edges, one said side edge of each said pair of inner side wall panels respectively connected by a fold line to each side edge of one said end wall, another pair of rectangular inner side wall panels having side edges, one *of* said side edges of each said other pair of inner side wall panels respectively connected by a fold line to each side edge of the other said end wall, an elongated flange connected to the upper edge of said one end wall and to the upper edges of said pair of inner side wall panels by score lines, another elongated flange connected to the upper edge of said other end wall and to the upper edges of said other pair of inner side wall panels by score lines, said flanges being uninterrupted adjacent the connections between said end walls and said inner side wall panels, said flanges being adapted and arranged to be folded substantially 180° to be closely adjacent the outer surfaces of said end walls and said inner wall panels a pluraity of locking flanges respectively connected to the other said side edge of respective said inner side wall panel.

8. An integral rectangular blank for folding into a container body comprising a rectangular bottom having opposite end edges and opposite side edges, a pair of end walls having lower edges respectively connected to said bottom end edges, a pair of outer side walls having lower edges respectively connected to said bottom side edges, a first pair of inner side wall panels being respectively connected by wall angle fold lines to respective side edges of one said end wall, a second pair of inner side wall panels being respectively connected by wall angle fold lines to respective side edges of the other said end wall, said inner side wall panels having lower free edges severed from the side edges of said outer side walls, an elongated flange extending along the upper edges of said one end wall and said first pair of inner side wall panels and being connected thereto by a double score line, another elongated flange extending along the upper edges of said other end wall and said second pair of inner side wall panels and being connected thereto by another double score line, each said flange being uninterrupted adjacent the connection between said end walls and inner side wall panels, said flanges being adapted to be folded on said double score lines outwardly of said end walls and said inner side wall panels, the upper edges of said outer side walls being adapted to be nestingly disposed between said flanges and said inner side *wall panels* [walls] said outer side walls having a predetermined length, a plurality of locking flanges respectively connected by a fold line to the other side edge of respective said inner side wall panel, the distance between said side edges of said inner side wall panels being approximately one-half said predetermined length of said outer side walls.

9. An integral blank for folding into a container body comprising a generally rectangular bottom having [elongated] side edges and end edges, a pair of outer side walls having [elongated] lower edges connected by fold lines respectively to said [elongated] side edges of said bottom, a pair of end walls having lower edges connected by fold lines respectively to said end edges of said bottom, a first pair of inner side wall panels having side edges connected by wall angle fold lines respectively to the side edges of one said end wall, a second pair of inner side wall panels having side edges connected by wall angle fold lines respectively to the side edges of the other said end wall, a first elongated flange connected to the upper edges of said first pair of inner side wall panels and the upper edge of said one end wall by a double score line, and a second elongated flange connected to the upper edges of said second pair of inner side wall panels and the upper edge of said other end wall, said inner side wall panels having lower free edges respectively severed from the side edges of said outer side walls an elongated flap connected by a fold line to each said inner side panels along its side edge opposite the wall angle connection with said end wall.

10. A covered rectangular container comprising a body portion and a cover portion, said body portion including two upstanding spaced end walls and two upstanding spaced side walls forming four wall angles, said body portion having a first elongated flange extending outwardly and downwardly *from* [over] the upper ends of one said side wall and one said end wall and terminating in a lower edge spaced downwardly from said upper ends, said body portion having a second elongated flange extending outwardly and downwardly *from* [over] the upper ends of the other said side wall and the other said end wall and terminating in a lower edge spaced downwardly from said upper ends, said flanges respectively being continuous around the wall angle between said one end and side wall and said other end and side wall, said flanges being under tension to maintain said flanges closely adjacent said end walls and side walls, said cover including a top panel and depending end and side walls. *said cover having* means *on oppositely disposed said cover walls* [attached to said cover end and side walls] for lockingly engaging said elongated flanges of said body portion adjacent *oppositely disposed said body walls* [each said end walls and side walls of said body portions], each *of* said elongated flanges of said body portion having opposite ends, said ends of each said flange being located adjacent respective said body side walls [generally medially there], [said ends of said first flange being closely adjacent respective ends of said second flange,] said cover *means including upward free edges engaging under respective said lower free edges of said* [side flanges engaging said first and second] body *flanges* [flange adjacent respective side walls of said body portions].

11. A rectangular container comprising a body portion including a bottom and upstanding end walls and upstanding outer side walls, upstanding inner side wall panels connected by vertical wall angle fold lines to each said end wall, said inner side wall panels extending from said wall angles toward the opposite end wall and terminating in an inwardly directed vertical locking flange generally perpendicular to said outer side walls, said locking flanges adjacent respective outer side walls being in face to face adjacent relation, flange means directly connected to said inner side wall panels and engaging said outer side wall panels for maintaining said outer side walls in upstanding positions, and another means positioned within said body portion engaging said locking flanges for retaining said locking flanges in said face to face relation.

*12. A closed rectangular container having a body and a cover, said cover comprising a rectangular top having four edges and four depending walls respectively attached to said edges, means for locking said cover to said body, said means including a pair of portions respectively associated with a pair of oppositely disposed said depending walls and terminating upwardly in respective locking edges within said cover, said body comprising a rectangular bottom having four edges and four upstanding walls respectively attached to said edges, each said body wall meeting two adjacent body walls to form respetcive wall angles between each meeting pair of body walls, said body walls having upper end portions constituting the upper portions of said body and each said upper end portion terminating upwardly in an upper edge, flange means disposed outwardly of and substantially surrounding said upper portion of said body, said flange means being substantially continuous around each of said wall angles, each said body wall having an inwardly facing inner surface, said flange means including flange portions respectively having an outwardly exposed outer surface which is respectively continuous from and along said inner surface of said body wall and over said body wall upper edge, said flange portions being outwardly disposed along respective upper end portions of said body walls and terminating downwardly in exposed lower edges outwardly of said body and below said upper edges of said body walls, said locking edges of said cover engaging respective oppositely disposed said lower edges of said flange portions thereby retaining said cover against upward removal from said body.*

*13. The closed rectangular container as defined in claim 12 wherein said flange means comprises a pair of semi-perimeter flanges.*

*14. The closed rectangular container as defined in claim 12 wherein said means for locking comprises another pair of portions respectively associated with the other pair of oppositely disposed said depending walls and terminating upwardly in respective locking edges within said cover, said locking edges of said other pair of portions of said cover engaging the other respective oppositely disposed said lower edges of said flange portions.*

*15. The closed rectangular container as defined in claim 12 wherein said four upstanding walls of said body are formed by respective four continuous wall panels and wherein each of two opposite said upstanding walls of said body are also formed by two partial wall panels.*

*16. The closed rectangular container as defined in claim 15 wherein each of said two partial wall panels are inwardly disposed with respect to respective said continuous wall panels.*

References Cited

The following references, cited by the Examiner, are of record in the patented file of this patent or the original patent.

UNITED STATES PATENTS

| | | | |
|---|---|---|---|
| Re. 20,428 | 6/1937 | Kells | 229—32 XR |
| 2,040,224 | 5/1936 | Unsinger | 229—45 XR |
| 2,475,107 | 7/1949 | Newson | 229—27 XR |
| 2,800,266 | 7/1957 | Kelly | 229—43 XR |
| 2,809,775 | 10/1957 | White | 229—34 |
| 3,110,434 | 11/1963 | Linda et al. | 229—51 |
| 3,116,867 | 1/1964 | Morgan | 229—34 |

DAVID M. BOCKENEK, *Primary Examiner.*

U.S. Cl. X.R.

229—42, 45